Patented Feb. 17, 1925.

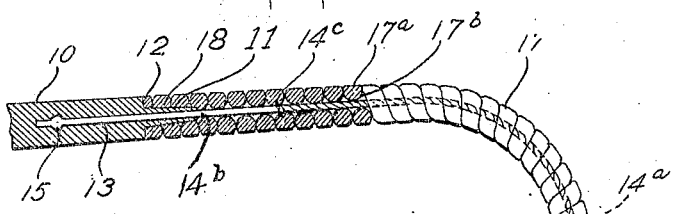

1,527,118

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed April 16, 1923. Serial No. 632,319.

*To all whom it may concern:*

Be it known that I, STEPHEN J. CLULEE, a citizen of the United States, and a resident of Attleboro, county of Bristol, and State of Massachusetts, have invented an Improvement in Eyeglass Construction, of which the following is a specification.

This invention relates to the construction of eyeglass parts and more particularly to the construction of temple bars employing non-metallic material. One of the objects of the invention is to provide a construction of the above nature practical and efficient and adapted to meet the requirements of use in a highly satisfactory manner. Another object is to provide such a construction which is neat in appearance and conducive to the comfort and convenience of the wearer. Another object is to provide such a construction of a strong and durable nature adapted for long-continued service. Other objects will be in part obvious or in part pointed out hereinafter.

The invention accordingly consists in the features of construction, combinations of elements, arrangements of parts, all as will be illustratively described herein, and the scope of the application of which will be indicated in the following claims.

In the accompanying drawing, in which are shown one or more of the various possible embodiments of the several mechanical features of this invention, Figure 1 is a partial side elevation of a temple bar shown partly in section to better disclose the structure;

Figure 2 is a detached, fragmentary view in section of a part shown in Fig. 1;

Figure 3 is a fragmentary view in section showing a modified form of certain parts of Fig. 1;

Figure 4 is a view similar to Fig. 2 showing another modification;

Figure 5 is a similar view showing still another form;

Figure 6 is a view similar to Fig. 1 showing a modified construction; and

Figure 7 is a diagrammatic plan view of a pair of temple bars.

Similar reference characters refer to similar parts throughout the several views of the drawing.

Referring now to the drawing in detail, there is shown in Fig. 1 the rear portion of a temple bar, the forward portion thereof being omitted since it is within the rear portion that this invention chiefly resides. A member 10 of celluloid or other suitable non-metallic material forms the main or body portion of the temple bar, which member 10, it will be understood, extends forwardly and is joined to the eyeglass rim or other lens mounting in the usual manner by means of a hinged connection. The rear end of the member 10 preferably terminates in a portion 11 of reduced diameter forming an annular shoulder 12, the portion 11 being formed, for example, by turning down the material of the member 10. Extending through the end portion 11 and to a substantial distance into the body of the main member 10 and substantially coaxial therewith is a longitudinal recess, indicated generally at 13. The end portion 11 of the member 10 is preferably tapered toward its extreme end to substantially the diameter of the recess 13.

Within the recess 13 is fitted one end of a metallic member 14 extending rearwardly therefrom and thence curved to suitable contour as to form the ear-piece of the temple bar. The curved portion of the metallic extension 14, generally indicated at 14ª, is flexible, being formed preferably of a spirally wound wire member, as indicated in the drawing, whereby the desired degree of flexibility is attained. The portion of the member 14 within the recess 13 and extending rearwardly to a substantial distance from the end of the body member 10, as to a point 14ᶜ for example, is of relatively rigid construction adapted to resist flexing to a greater degree than the remaining portion 14ª. The flexible portion 14ᵃ of the member 14 and the more rigid portion 14ᵇ thereof may be formed from two separate members secured together as by soldering at the point 14ᶜ. Preferably, however, the member 14 is formed from one continuous member of spirally wound wire, as above mentioned, and the more rigid portion thereof is formed by soldering together the adjacent coils of that portion. The spirally wound wire member is preferably tinned throughout its length and a portion thereof is dipped in suitable flux, whereupon the coils of that portion are readily soldered together to form a desired relatively rigid portion 14$^b$.

The portion of the member 14 within the recess 13 is provided adjacent its end with projections preferably taking the form of a pair of oppositely disposed flanges 15 formed thereon. These flanges 15 embedded in the non-metallic member 10 as shown serve to provide a firm, dependable connection between the extension 14 and the body member 10 avoiding danger of the extension 14 turning in the recess 13 or being withdrawn therefrom.

In joining the extension 14 and body member 10 the recess 13 is preferably first formed, for example, by drilling. The portion of the member 10 about the recess may then be softened by heating or other means and the end of the member 14 having the flanges 15 formed thereon may then be forced into the recess and into place therein. The material of the member 10 is then pressed firmly in about the member 14 and a secure connection is obtained. The tapered end 11 may be formed before or after the insertion of the extension member 14 as is desired.

As before mentioned, the rear portion of the metallic extension 14 is curved substantially to the contour of an ear-piece as shown at 14$^a$. A non-metallic strip or ribbon 17 of celluloid or other suitable material shaped in any desired manner to suitable cross section having been first softened to a suitable degree as by heating or immersion in a suitable solvent solution is now wound spirally upon the metallic extension 14, the extension 14 thus forming a suitable core therefor. Preferably, however, the ribbon 17 after being shaped and softened as above described is wound upon a suitable mandrel of substantially the diameter of the core 14 and after forming thereon is thereupon slipped over the extension 14 from its end remote from the body member 10. In Fig. 1 the strip 17 is shown as having a cross section providing an outer substantially flat face 17$^a$ and an inner rounded face 17$^b$ against the core 14. The flat face 17$^a$ thus forms a substantially continuous and substantially smooth exterior surface for the curved ear-piece, while the inner curved surfaces 17$^b$ permit the ready flexing of the spirally wound ribbon 17 with the flexible core 14$^a$ without disturbing the alignment of the outer flat surfaces formed by the surfaces 17$^a$.

The end portion of the strip 17 adjacent the body member 10 is wound upon or surrounds the tapered extension 11 of the member 10. After the strip 17 has been coiled and formed in a spiral cable upon a suitable mandrel as above described, preferably a portion of the material thereof is removed from the inner walls of the part of the cable which is to fit over the tapered extension 11, and the bore of the cable at this portion is thereby made to conform to the general contour of the tapered extension 11. This is clearly shown at 18 in Fig. 1, and it will be seen that the inner rounded surface of the spiral strip 17 is made flat so that a relative larger surface of contact between the strip 17 and the extension 11 is obtained. Also, the flat exterior surface 17$^a$ of the strip is substantially flush with the surface of the member 10 at the shoulder 12 and a generally uniform exterior contour of the temple bar is had. With the end portion of the spiral strip 17 thus in place upon the part 11 and abutting the shoulder 12, these parts may be treated in some suitable manner to cause the contacting parts to flow and merge into one another, or the contacting surfaces may be joined by cementing. It will be seen that the inner flat surfaces 18 of the strip 17 about the part 11 providing a large contacting surface as above mentioned insure a firm connection when the parts are thus joined.

The other end of the spiral strip 17 terminates preferably a short distance from the end of the flexible core member 14$^a$, as is shown at 19. The extreme end of the core 14$^a$ is preferably threaded, as shown more clearly in Fig. 2, and threaded thereon is a cap member 20 of non-metallic material the same as the strip 17. The cap 20 is joined to the end coil of the strip 17 by means of molding or cementing and thus forms a dependable anchorage for the end of the strip 17 as well as a smooth rounded end for the ear-piece.

Referring now to Fig. 6 there is shown a slight modification of the construction shown in Fig. 1. The main non-metallic body member 10 terminates at 12. A metallic extension is fitted within a recess 13 therein having a relatively rigid portion 14$^b$ extending rearwardly substantially to a point 14$^c$ and a curved flexible portion 14$^a$ and is provided with flanges 15 at its portion within the recess 13 substantially as described with regard to Fig. 1. Upon the non-metallic cable 17 having been shaped and formed upon a suitable mandrel as before described and cut to the required length, there are cemented or otherwise secured to its ends a pair of non-metallic washers or ferrules 30 and 31. Thereupon the cable 17 is slipped over the metallic core 14 until the washer 30 abuts the end 12 of the member 10. The cap 20 is then threaded upon the end of the core and snugly up against the washer 31. In this manner, if it be desired to remove the winding 17 for any reason, it is merely necessary to remove the cap 20, whereupon the non-metallic cable may be readily slipped off and may also be readily replaced, its ends being securely held by the washers 30 and 31.

It will be seen that the temple bar formed and assembled as above described provides a construction embodying many practical and useful advantages. The construction is strong and durable, the parts being joined in a manner which insures dependability. The ear-piece formed by the flexible core 14ª and its spiral covering 17 is readily flexed and thus conveniently adjustable to the curvature of the back of the ear promoting convenience and comfort to the wearer. The spirally wound portion adjacent the end of the body member 10 of the temple bar, however, is less flexible due to the relatively rigid core portion 14ᵇ therein and this intermediate portion of lesser flexibility, as it might be termed, serves in effect to provide a gradual increase of flexibility from the end of the substantially rigid member 10 to the curved portion forming the ear-piece. Thus there is no objectionable weakness caused by a too-sudden increase of flexibility at the junction of the spirally wound portion of the temple bar and the main body portion 10.

Figs. 3, 4 and 5 show modifications of the form of the non-metallic spiral winding 17 shown in Fig. 1. As shown in Fig. 3, the winding takes the form of a strip 21 having a cross section substantially circular but with one side having formed therein a rounded longitudinal groove 22 so that the adjacent coils of the winding interfit or overlap in substantially the manner of a ball and socket connection. The winding shown in Fig. 4 comprises two strips of material of curved cross section, one strip, as 23, presenting a concave surface outwardly from the core 14 and the other strip, as 24, presenting a concave surface inwardly, the two strips being wound conjointly and overlapping as shown to form a flexible covering about the core member 14. The winding of Fig. 5 comprises a single strip curved in cross section and shaped so that one longitudinal portion thereof presents a concave surface 25 outwardly and the other longitudinal portion thereof presents a concave surface 26 inwardly, the strip being wound upon the core 14 so that its adjacent coils overlap in the manner shown. It will be seen that each of these windings provides a covering which is easily flexed with the metallic core 14 providing a smoothly operating structure and which presents a substantially regular exterior surface. Furthermore, as the parts are flexed, there are no gaps between the adjacent coils whereby the core 14 may come into view. The metallic core is at all times concealed from view thus enhancing the desired celluloid appearance of the temple bar. It is to be understood that the modified forms of windings shown in Figs. 3, 4 and 5 are mounted and secured with the coacting parts to form the temple bar substantially as the winding 17 of Figs. 1 and 6 above described.

In Fig. 7 there is shown a diagrammatic plan view of a pair of temple bars of substantially the type above described adapted to hold a pair of eyeglasses in position upon the wearer. The temple bar 27 is adapted to serve on the right-hand side of the eyeglasses and the temple bar 28 on the left-hand side. As is brought out in this figure, the non-metallic spiral windings of the two temple bars are preferably wound upon their cores in opposite directions, that is, the covering of the right-hand temple bar is wound in one direction and that of the left-hand temple bar in the other direction. The winding tends to twist or curve the ear-piece to one side, and by winding the respective portions in opposite directions, as shown, the tendency of each is to twist the ear-piece inwardly toward the other. Thus there results a natural tendency for both ear-pieces to assume a snugly fitting and comfortable position upon the wearer.

It will thus be seen that there has been provided in this invention an eyeglass temple bar construction in which the several objects hereinabove mentioned, together with many thoroughly practical advantages are achieved.

As many possible embodiments may be made of this invention and as many changes might be made in the embodiments above set forth, all without departing from the scope of the invention, it is to be understood that all matter herein set forth or shown in the accompanying drawings is to be interpreted as illustrative and not in a limiting sense.

I claim as my invention:

1. In a construction for temple bars and the like, in combination, a flexible metallic core member, and an outer non-metallic covering about said core and adapted to be flexed therewith, said covering including a ribbon-like member having co-mating contacting surfaces, thereby being adapted to conceal said core at all times regardless of the flexing thereof.

2. In construction for temple bars and the like, in combination, a flexible metallic core member, and an outer non-metallic covering spirally wound about said core and adapted to be flexed therewith, said covering having adjacent side portions formed to fit one into the other and thereby being adapted to conceal said core at all times regardless of the flexing thereof.

3. In construction for temple bars and the like, in combination, a metallic core member, and an outer non-metallic covering wound lengthwise about said core, said winding having overlapping portions.

4. In construction for temple bars and the like, in combination, a metallic core member, and an outer non-metallic covering coiled about said core, adjacent coils being shaped to substantially conceal the junction therebetween.

5. In construction for temple bars and the like, in combination, a flexible metallic core member, and a non-metallic covering in strip form coiled about said core member and adapted to be flexed therewith, said non-metallic covering in strip form having intermeshing sides adapted to work one on the other when said core member and covering are flexed.

6. In construction for temple bars and the like, in combination, a flexible metallic core member, and a non-metallic covering in strip form coiled about said core member and adapted to be flexed therewith, the adjacent coils having portions overlapping whereby exposure of said core as it is flexed is avoided.

7. In construction for temple bars and the like, in combination, a metallic core member, and a non-metallic covering coiled about core member, adjacent coils thereof having portions formed to interfit.

8. In construction for temple bars and the like, in combination, a pair of temple bars each having an inner metallic core member and a spirally wound non-metallic covering about said core member, the spiral covering of one being wound in the opposite direction from that of the other.

9. In construction for temple bars and the like, in combination, a pair of temple bars each having an ear piece comprising a flexible metallic core member and a spirally wound non-metallic covering thereabout, one of said spiral coverings being wound in a direction opposite to that in which the other is wound.

10. In construction for eyeglass temple bars and the like, in combination, a metallic core member, and a covering of celluloid coiled about said core, adjacent coils thereof being shaped to inter-fit along their abutting surfaces.

11. In construction for eyeglass temple bars and the like, in combination, a metallic core member, and a covering of celluloid coiled about said core, adjacent coils thereof having rounded surfaces which inter-fit.

12. In construction for temple bars and the like, in combination, a main body portion of non-metallic material, a metallic member comprising a substantially rigid part extended forwardly into said main body portion and extending rearwardly to a substantial distance therefrom and a flexible end portion portion, said rigid part having projections thereon interlocked with said main body portion, and a non-metallic relatively flexible covering about those portions of said metallic member exterior of said main body portion.

13. In construction for temple bars and the like, in combination, a main body portion of non-metallic material, and a metallic extension secured thereto having a flexible portion and a relatively rigid portion.

14. In construction for temple bars and the like, in combination, a main body portion of non-metallic material, and a flexible metallic member curved to substantially the contour of an ear piece and connected to said main body portion by relatively rigid metallic means.

15. In construction for temple bars and the like, in combination, a main body portion of non-metallic material, and a metallic extension comprising a substantially rigid part connected to said main body portion and extending rearwardly to a substantial distance therefrom and a flexible end portion.

16. In construction for temple bars and the like, in combination, a main body portion of non-metallic material, and a metallic extension connected thereto having a rear flexible portion curved to the contour of an ear piece and a relatively rigid portion adjacent said main body portion.

17. In construction for temple bars and like, in combination, a main body portion of non-metallic material, a substantially rigid metallic member embedded therein and extending rearwardly therefrom to a substantial distance, and flexible metallic means forming a continuation of said metallic member and curved to substantially the contour of an ear piece.

18. In construction for eyeglass temple bars and the like, in combination, a metallic core member, and a covering of celluloid coiled about said core, each coil thereof having a concave surface and a convex surface coacting respectively with a convex surface and a concave surface of the coils adjacent thereto.

19. In construction for temple bars and the like, in combination, a main body portion of non-metallic material, a flexible non-metallic portion connected thereto forming an ear piece, and a flexible metallic core for said last portion, said core having a relatively rigid part adjacent said main body portion.

20. In construction for temple bars and the like, in combination, a main body portion of non-metallic material, a spirally wound non-metallic member connected thereto, and a metallic core for said last member, said core having a flexible portion and a relatively rigid portion adjoining said main body portion.

21. In construction for eyeglass temple bars and the like, in combination, a metallic core member, and a celluloid strip coiled about said core forming a covering therefor, said strip having a longitudinally extending groove formed therein whereby one coil about said core is interengaged by an adjacent coil.

22. In construction for eyeglass temple bars and the like, in combination, a metallic core member, and a celluloid strip wound about said core forming a covering therefor, said strip having on one side a convex surface and on the opposite side a concave surface substantially complementary thereto.

23. In construction for eyeglass temple bars and the like, in combination, a flexible metallic core member, and a celluloid strip wound about said core forming a covering therefor, said strip having on one side a convex surface and on the opposite side a concave surface of substantially similar curvature.

24. In construction for eyeglass temple bars and the like, in combination, a main body portion of celluloid, a metallic member extending rearwardly therefrom, and a celluloid covering over said metallic extension comprising a spiral winding, the adjacent coils of which are shaped to interfit along their abutting surfaces.

25. In construction for temple bars and the like, in combination, a main body portion of non-metallic material, a metallic member forming an extension of said main body portion and comprising a substantially rigid part connected to said main body portion and a flexible end portion, and a non-metallic covering about said metallic extension member.

26. In construction for temple bars and the like, in combination, a main body portion of non-metallic material, a metallic core member extending rearwardly therefrom, a flexible non-metallic covering about said core member, and means adapted removably to hold said covering against longitudinal movement relative to said core, said main body portion and said covering being shaped at their adjacent end parts to present surfaces contacting one with the other.

27. In construction for temple bars and the like, in combination, a main body portion of non-metallic material, a metallic core member extending rearwardly therefrom, a spirally wound cable of non-metallic material about said core, and a non-metallic washer secured to an end of said cable.

28. In construction for temple bars and the like, in combination, a main body portion of non-metallic material, a metallic core member extending rearwardly therefrom, a non-metallic cable wound about said core, a non-metallic washer about said core at either end of said cable and secured to said cable, and a member removably secured to the end of said core remote from said body member and holding said cable in place.

29. In construction for temple bars and the like, in combination, a main body portion of non-metallic material, a metallic core member extending rearwardly therefrom, a spirally wound cable of non-metallic material about said core, means independent of said main body portion for holding the end of said cable adjacent said main body portion against unwinding, and threaded means for holding said spirally wound cable on said core.

30. In construction for temple bars and the like, in combination, a main body portion of non-metallic material, a metallic core member extending rearwardly therefrom, a spirally wound cable of non-metallic material about said core, means independent of said main body portion for holding the end of said cable adjacent said main body portion against unwinding, means for anchoring the other end of said cable against unwinding, and means removably holding said spirally wound cable in assembled relation with respect to said main body portion and said metallic core member.

In testimony whereof, I have signed my name to this specification this fifth day of April, 1923.

STEPHEN J. CLULEE.

DISCLAIMER.

1,527,118.—*Stephen J. Clulee*, Attleboro, Mass. EYEGLASS CONSTRUCTION. Patent dated February 17, 1925. Disclaimer filed October 15, 1925, by the assignee, *Bay State Optical Co.*

The word "flexible" as used throughout the claims, and specifically claims 1, 2, 5, 6, 9, 12, 13, 14, 15, 16, 17, 19, 20, 23, 25, and 26, is liable to too broad an interpretation, and so interpreted, to cover elements not intended to be covered by this term, the liability to such possible interpretation not being intended or foreseen and thus being accidental, it is hereby stated that the said term "flexible" as thus used means nonsolid and self-fitting and having an ease of flexing of the order of that of a coiled member, and any broader meaning or interpretation of such term is hereby disclaimed.

Further to clarify the term "flexible," not only in its intrinsic meaning, but with relation to the "main body portion," and to restrict the latter term and disclaim possible unduly broad interpretation thereof, it is hereby stated that by the term "main body portion" as used throughout the claims, and specifically claims 12, 13, 14, 15, 16, 17, 19, 20, 24, 25, 26, 27, 28, 29, and 30, is meant a member large in circumference and relatively nonflexible as a whole, as compared with the flexible metallic extension, and of a circumference substantially equal to or larger than the entire extension, metallic and nonmetallic, and a broader interpretation or meaning of the said term is hereby disclaimed.

[*Official Gazette November 10, 1925.*]